US011950712B2

(12) United States Patent
Spiro et al.

(10) Patent No.: US 11,950,712 B2
(45) Date of Patent: Apr. 9, 2024

(54) HANGING FRAME ASSEMBLY

(71) Applicant: Tracer Imaging LLC, Ossining, NY (US)

(72) Inventors: Steven M. Spiro, Chappaqua, NY (US); Ryan Kelly, Scarsdale, NY (US); Jessica Huffman, Elmsford, NY (US)

(73) Assignee: TRACER IMAGING LLC, Ossining, NY (US)

( * ) Notice: Subject to any disclaimer, the term of this patent is extended or adjusted under 35 U.S.C. 154(b) by 1 day.

(21) Appl. No.: 17/587,031

(22) Filed: Jan. 28, 2022

(65) Prior Publication Data

US 2022/0233000 A1 Jul. 28, 2022

Related U.S. Application Data

(60) Provisional application No. 63/142,723, filed on Jan. 28, 2021.

(51) Int. Cl.
*G09F 15/00* (2006.01)
*A47F 5/08* (2006.01)
(Continued)

(52) U.S. Cl.
CPC .............. *A47F 5/0846* (2013.01); *A47G 1/06* (2013.01); *A47G 1/1686* (2013.01); *G09F 1/12* (2013.01);
(Continued)

(58) Field of Classification Search
CPC ...... A47F 5/0846; A47F 5/0025; A47F 3/005; A47F 5/0876; A47F 5/10; A47F 7/00;
(Continued)

(56) References Cited

U.S. PATENT DOCUMENTS 214,926 A * 4/1879 Lane ...................... A47H 23/01 160/349.1
271,438 A * 1/1883 Edwards .................. E06B 9/46 160/396
(Continued)

FOREIGN PATENT DOCUMENTS

DE 202014101582 U1 * 5/2015 ............... A47H 1/19
GB 2233808 B 4/1993

OTHER PUBLICATIONS

English Translation of DE-202014101582-U1 to Inventex (Year: 2015).*
(Continued)

*Primary Examiner* — Cassandra Davis
(74) *Attorney, Agent, or Firm* — Leason Ellis LLP

(57) ABSTRACT

An article for hanging on a support surface includes a substrate having a first end and a second end. The article includes a pair of rails with each rail including a recessed channel that extends in a longitudinal direction. A pair of splines is provided with each spline including a raised ridge that extends in a longitudinal direction. The raised ridge is inserted into the recessed channel. The article also includes a first pair of end caps. An elongated hanging element passes through the slots of the first pair of end caps. Wherein in an assembled state, one rail and one spline are disposed adjacent one another such that the raised ridge is at least partially inserted into the recessed channel and the substrate is captured within the recessed channel and the first pair of end caps are disposed over opposite ends of the one rail and one spline to join and hold the one rail and one spline against one another with the substrate captured therebetween.

10 Claims, 4 Drawing Sheets

(51) Int. Cl.

| | |
|---|---|
| ***A47G 1/06*** | (2006.01) |
| ***A47G 1/16*** | (2006.01) |
| ***G09F 1/12*** | (2006.01) |
| ***G09F 7/18*** | (2006.01) |

(52) U.S. Cl.
CPC ........ *G09F 7/18* (2013.01); *A47G 2001/0677* (2013.01); *G09F 2007/186* (2013.01)

(58) Field of Classification Search
CPC .......... A47F 3/001; A47F 3/004; A47G 1/06; A47G 1/1686; A47G 2001/0677; A47G 25/0657; A47G 25/481; G09F 1/12; G09F 7/18; G09F 2007/186; A47H 1/00; A47H 23/01; A47H 2023/025; A47H 1/19; A47H 1/18
USPC ....... 40/617, 603, 648, 658; 160/330, 349.1, 160/382, 383, 384, 394, 393, 396, 397, 160/399, 401, 403, 368.1
See application file for complete search history.

(56) References Cited

U.S. PATENT DOCUMENTS

| | | | | | |
|---|---|---|---|---|---|
| 1,021,555 | A * | 3/1912 | Purat | A47H 23/01 | 160/393 |
| 1,580,958 | A * | 4/1926 | Chapman | D06F 59/08 | 211/45 |
| 5,090,145 | A * | 2/1992 | Chiang | A47G 1/065 | 40/605 |
| 5,428,913 | A * | 7/1995 | Hillstrom | G09F 7/18 | 40/604 |
| 6,517,075 | B1 * | 2/2003 | Yoon | F41J 3/0057 | 273/348.3 |
| 7,086,105 | B1 * | 8/2006 | Gottlieb | A47C 21/026 | 5/492 |
| 8,016,013 | B2 * | 9/2011 | Horvath | E06B 9/54 | 160/393 |
| 10,803,777 | B1 | 10/2020 | Moody | | |
| 2004/0016164 | A1 | 1/2004 | Gilchrist et al. | | |
| 2004/0250458 | A1 * | 12/2004 | Kim | G09F 17/00 | 40/617 |
| 2012/0151811 | A1 | 6/2012 | Ivall | | |

OTHER PUBLICATIONS

International Search Report and Written Opinion in PCT Application No. PCT/US22/14273, dated May 12, 2022 (16 pages).

* cited by examiner

HANGING FRAME ASSEMBLY

CROSS REFERENCE TO RELATED APPLICATION

The present application claims priority to and the benefit of U.S. patent application Ser. No. 63/142,723, filed Jan. 28, 2021, which is hereby incorporated by reference in its entirety.

TECHNICAL FIELD

The present disclosure is directed to an article for displaying a substrate, such as a canvas, photograph or artwork, and more particularly, relates to a hanging frame assembly (frame) that is configured to capture and hold the substrate and also be hung on or mounted to a support surface, such as a wall.

BACKGROUND

For years, the most common way for displaying an object, such as a canvas, on a support surface, such as a wall, is to use a frame that holds the object and is configured to be hung on the wall. There are many different types of frames with the most common ones being those that completely surround the object. For some objects, like tapestries, flags, banners, and scrolls, etc., they can be hung by a top rod that passes through a pocket or closed channel formed at the top of the object to be hung.

There is a desire to provide an alternative way to hang an object that is easier to assembly and also does not require the object, such as a canvas, to have a special construction, such as the top pocket or closed channel mentioned above.

SUMMARY

An article for hanging on a support surface includes a substrate having a first end and a second end. The article includes a pair of rails with each rail including a recessed channel that extends in a longitudinal direction. A pair of splines is provided with each spline including a raised ridge that extends in a longitudinal direction. The raised ridge is configured for insertion into the recessed channel. The article also includes a first pair of end caps. Each end cap of the first pair of end caps having an end walls and side walls that define a hollow interior, wherein each end cap of the first pair of end caps further includes slots that are formed in two of the side walls that are opposite one another. The article includes an elongated hanging element that has enlarged portions at two opposite ends thereof. The elongated hanging element passes through the slots of the first pair of end caps with the enlarged portions being located external to the first pair of end caps. Wherein in an assembled state, one rail and one spline are disposed adjacent one another such that the raised ridge is at least partially inserted into the recessed channel and the substrate is captured within the recessed channel and the first pair of end caps are disposed over opposite ends of the one rail and one spline to join and hold the one rail and one spline against one another with the substrate captured therebetween.

The article includes a second pair of end cap with each end cap of the second pair of end caps having an end walls and side walls that define a hollow interior. Wherein in the assembled rate, the other rail and the other spline are disposed adjacent one another such that the raised ridge is at least partially inserted into the recessed channel and the substrate is captured within the recessed channel and the second pair of end caps are disposed over opposite ends of the one rail and one spline to join and hold the one rail and one spline against one another with the substrate captured therebetween.

BRIEF DESCRIPTION OF THE DRAWING FIGURES

DETAILED DESCRIPTION OF CERTAIN EMBODIMENTS

Figure 1:
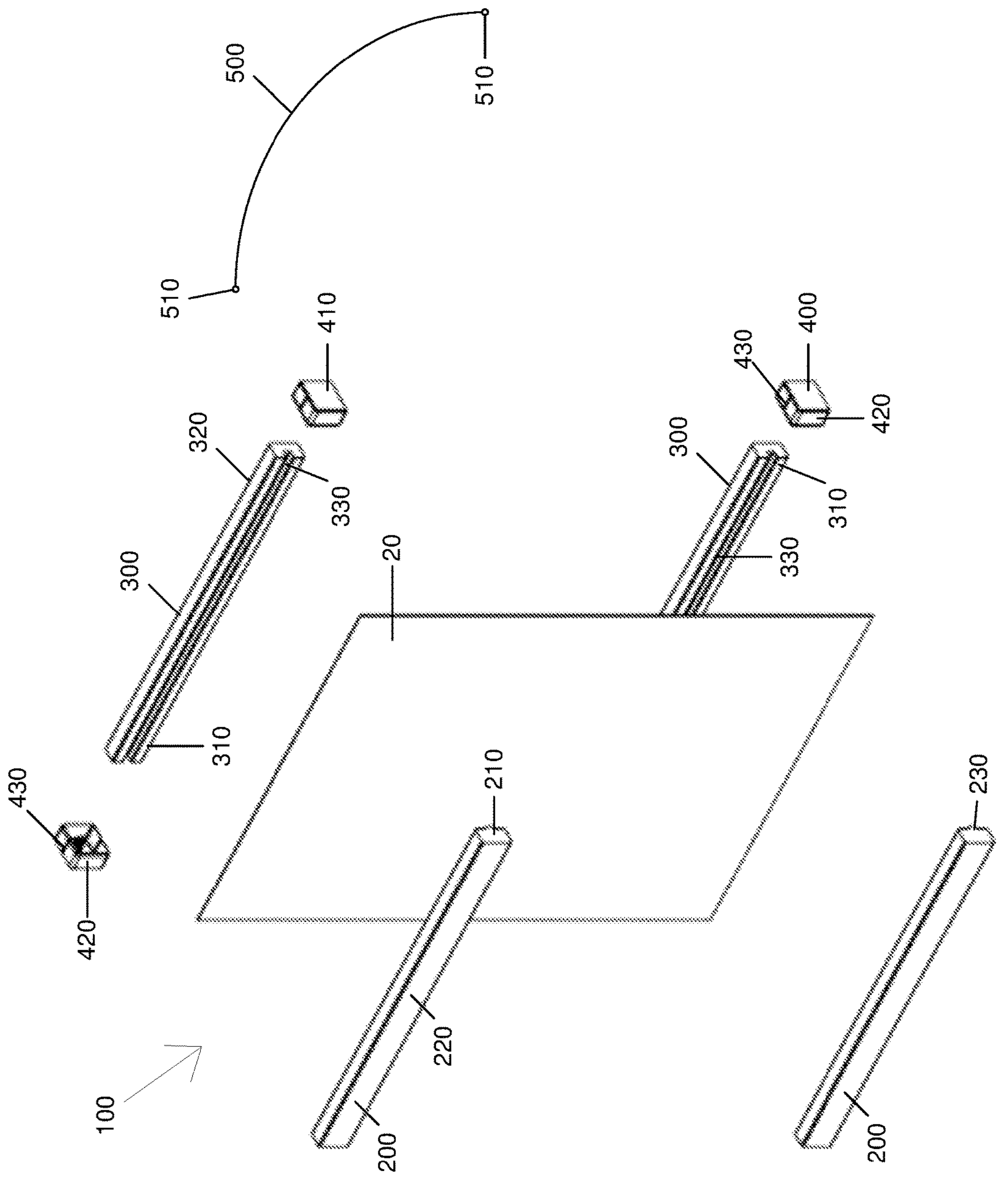
FIG. 1 is an exploded perspective view of a hanging frame assembly according to one embodiment.

In accordance with the present disclosure, as illustrated in FIG. 1, a display system or assembly (kit) is shown and described and is configured to create an article that can be displayed and hung on a support surface, such as a wall. The article is configured to display an object that is in in the form of a substrate 20 that is held and displayed within the article. The substrate 20 can take many different forms, such as a piece of a paper stock, a photo, artwork, a canvas, or other artistic expression that is embodied in the substrate 20. In one preferred embodiment, the substrate 20 is in the form of a canvas (rollable piece of canvas).

As described herein, the article provides an easy to use and easy to assemble kit that allows a user to assemble and hold the substrate 20 therein.

In the present disclosure, the article takes the form of a hanging frame assembly 100. Besides the substrate 20 that is to be hung, the hanging frame assembly 100 has the following main parts, namely, a pair of splines 200, a pair of rails 300, a pair of end caps 400 and an elongated hanging element 500, such as a cable, string, yarn, wire, etc. For ease of discussion, the elongated hanging element 500 is described herein as being string 500; however, as mentioned, this element is not limited to only being a string.

Pair of Splines 200

The hanging frame assembly 100 includes the pair of splines 200. Each spline 200 has an elongated body with an inner surface 210 and an opposing outer surface 220. Along the inner surface 210 there is a raised ridge 230. The raised ridge 230 extends longitudinally along the length of the spline 200. In the illustrated embodiment, the ridge 230 extends the entire length of the spline 200; however, in other embodiments, it does not extend the entire length. While the illustrated embodiment depicts a single continuous ridge 230 that runs along the inner surface 210, it will be appreciated that the ridge 230 can segmented and formed of a plurality of spaced ridges that are co-linear (co-axial).

The ridge 230 can have a rounded construction or it can be pointed (e.g., more triangular shape) or it can even have a wave appearance with peaks and valleys.

The ridge 230 is shown as being centrally formed along the inner surface 210 which is the preferred location. However, it is possible to form the ridge 230 at an off-center position.

The spline 200 can thus be considered to be a male component due to the presence of the center ridge 230.

The spline 200 can be formed of any number of different materials, including but not limited to, wood, plastic, metal, etc.

Typically, the two splines 200 have identical constructions (e.g., identical lengths); however, it is possibly for one spline 200 to be longer than the other one as in the case of when the substrate 20 has one end that is wider (longer) than the other end.

Pair of Rails 300

The hanging frame assembly 100 includes the pair of rails 300. Each rail 300 has an elongated body with an inner surface 310 and an opposing outer surface 320. Along the inner surface 310 there is a recessed channel (groove) 330. The recessed channel 330 extends longitudinally along the length of the rail 300. In the illustrated embodiment, the channel 330 extends the entire length of the rail 300; however, in other embodiments, it does not extend the entire length. While the illustrated embodiment depicts a single continuous channel 330 that runs along the inner surface 310, it will be appreciated that the channel 330 can segmented and formed of a plurality of spaced channels that are co-linear (co-axial).

The channel 330 is shown as being centrally formed along the inner surface 210 which is the preferred location. However, it is possible to form the channel 330 at an off-center position.

The rail 300 can thus be considered to be a female component due to the presence of the center recessed channel 330.

The ridge 230 and channel 330 are complementary to one another in that the channel 330 is configured to receive the ridge 230 for capturing the substrate 20 therebetween as described herein. As shown in the figures, the ridge 230 is undersized relative to the channel 330 such that it does not and cannot occupy a majority of the channel 330 (See, FIG. 2). The ridge 230 is designed to locally deform the substrate when the spline and rail are combined and the substrate 20 gets pinched at certain surfaces.

The rail 300 can be formed of any number of different materials, including but not limited to, wood, plastic, metal, etc.

Typically, the two rails 300 have identical constructions (e.g., identical lengths); however, it is possibly for one rail 300 to be longer than the other one as in the case of when the substrate 20 has one end that is wider (longer) than the other end.

Pair of End Caps 400

The hanging frame assembly 100 includes the pair of end caps 400.

Each end cap 400 is a hollow end cap that has an end wall 410 and side walls 420. In the illustrated embodiment, the end cap 400 has a square shape and there are four side walls 420 perpendicular to the end wall 410.

Two of the side walls 420 that are opposite one another have open slots 430 formed therein. The slots 430 are open along the top edges of the opposing side walls 420. The slots 430 can extend and terminate close to or at the end wall 410 (i.e., at the intersection of side wall and end wall). The slots 430 themselves are formed directly opposite one another.

As described herein, the slots 430 are configured to receive the string 500. The slots 430 also serve an additional function that they allow for passage of the substrate 20 when the spline and rail are assembled. The size of the slots 430 are thus slightly greater than the thickness of the substrate 20. The slots 430 also are sized so that both the substrate 20 and the string or rope 500 can pass.

The shape and size of the end caps 400 are selected so that one complementary mated spline 200/rail 300 is received and captured inside the hollow interior of the end cap 400. In other words, the end cap 430 caps off ends of the assembled spline and rail. The assembled spline/rail can thus be frictionally held within the end caps 400 at their opposing ends.

The end cap 400 can be formed of any number of different materials, including but not limited to, wood, plastic, metal, etc.

Figure 5:
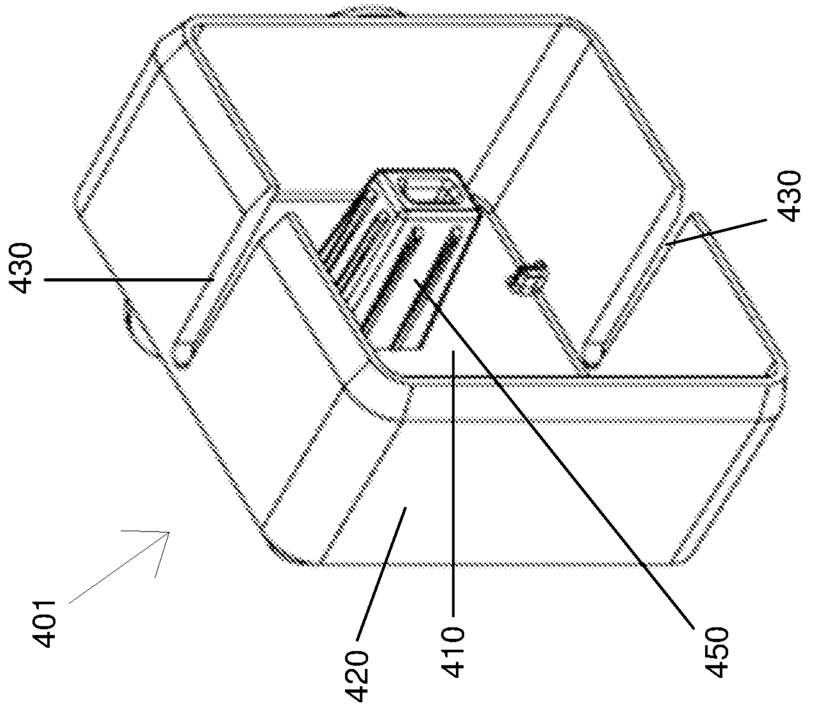
FIG. 5 is a perspective view of the end cap.

As shown in FIG. 5, the hollow interior of the end cap 400 can include a protrusion 450 that protrudes from the end wall 410. This protrusion 450 is positioned and sized and shaped to be received within the channel 330 when the end cap 400 is attached to the combined rail/spline.

As shown, the protrusion 450 is formed in an off-centered position along the end wall 410. The protrusion 450 can be held in the end of the channel 330 by a friction fit. The substrate 20 is thus positioned (pinched) between the protrusion 450 and the raised ridge 230.

Elongated Hanging Element 500

As mentioned herein, the elongated hanging element 500 can be in the form of a string, cable, rope, cord or the like that is used to hang the entire hanging frame assembly 100 including the substrate 20. The two ends of the elongated hanging element 500 includes respective knots 510.

Assembly Process

To assemble the hanging frame assembly 100, the user lays down one of the rails 300 with the inner surface 310 and the channel 330 facing upward. One end (e.g., the top end) of the substrate 20 is then placed on the inner surface 310 with the channel 330 being preferably completely covered by the substrate 20. In other words, one edge of the substrate 20 is disposed over the elevated planar surface that is adjacent the channel 330. This planar surface can include guide markings, such as one or more lines at the ends of the rail 300 to guide the user in the placement of the edge of the substrate 20 so that the substrate 20 is aligned.

The respective spline 200 is placed over the substrate 20 which remains laid over the inner surface 310. The raised ridge 230 is placed over the area of the substrate 20 that is disposed over the channel 330.

Figure 6:
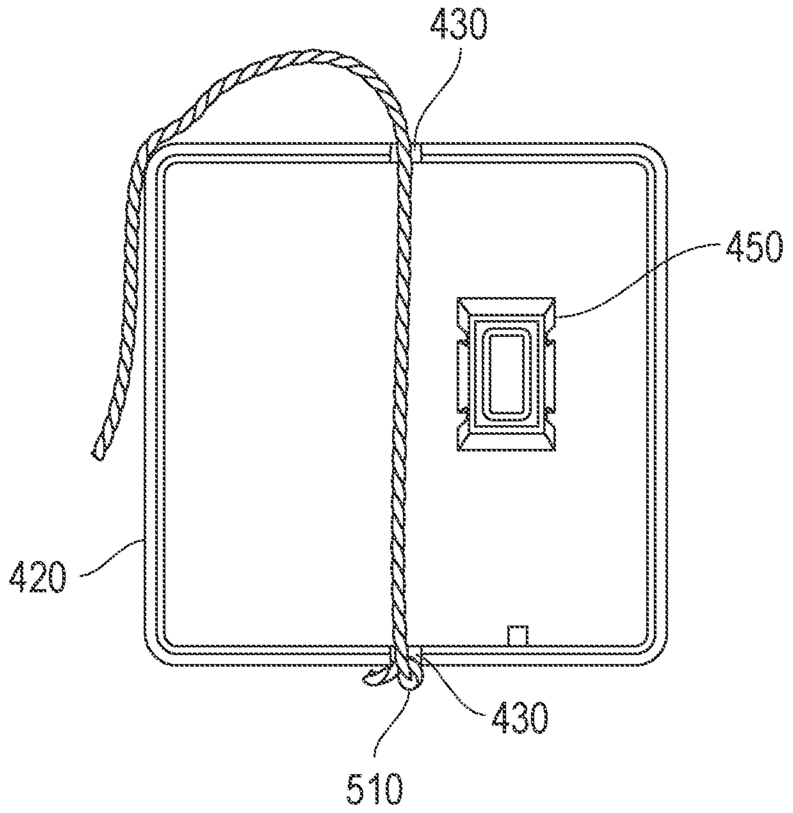
FIG. 6 is a cross-sectional view showing the installed end cap.

Next the end caps 400 are prepared by placing the ends of the string 500 through the slots 430 so that the knots 510 lie external to one side wall 420 as shown in FIG. 6. Since the slots 430 extend to the end wall 410, the string 500 has the ability to slide and move in the slots 430 and can be pushed to the end wall 410.

The user then applies a force to the combined spline 200 and rail 300 to cause the ridge 230 to enter the channel 330 and since the substrate 20 is disposed between the spline 200 and the rail 300, the substrate 20 is captured. In other words, the substrate 20 pushed into and is captured in the channel 330.

As the user holds the combined spline 200 and rail 300, one end cap 400 is placed over one end of the combined spline 200 and rail 300 with the string 500 remaining in the slots 430. It will be appreciated that the slots 430 are formed such that they align with the substrate 20 (and also align with the interface (gap) formed between the spline 200 and rail 300). The process is then repeated at the other end of the combined spline 200 and rail 300. The knots 510 face downward toward the substrate 20. The string 500 can be pulled outward to eliminate any slack and position the knots 510 against the side walls.

The process is then repeated with the other end of the substrate 20 in that the other end of the substrate 20 is laid over the channel 330 formed in the other rail 300. The user then applies a force to the combined other spline 200 and rail 300 to cause the ridge 230 to enter the channel 330 and since the substrate 20 is disposed between the spline 200 and the rail 300, the substrate 20 is captured. In other words, the substrate 20 pushed into and is captured in the channel 330.

As the user holds the combined other spline 200 and rail 300, the other end cap 400 is placed over the other end of the combined spline 200 and rail 300 with the string 500 remaining in the slots 430. It will be appreciated that the slots 430 are formed such that they align with the substrate 20 (and also align with the interface (gap) formed between the spline 200 and rail 300). The process is then repeated at the other end of the combined spline 200 and rail 300.

It will also be appreciated that the end caps 400 that are used at the bottom do not require or receive the string 500 and therefore they can include no slots 430. In other words, the bottom end caps 400 can be solid without slots 430.

The string 500 can then be hung on a wall or the like by placing the string 500 over a fastener, such as a nail, that is located in the wall.

As shown, the hanging frame assembly 100 can be also thought of as being a snap-to-hanging canvas product that is easily assembled to produce a fresh, clean product.

It will also be appreciated that in one embodiment, the bottom combined spline/rail can be eliminated. In this embodiment, the bottom end of the substrate 20 is left without the spline/rail and end caps and has a "rough" appearance. However, the inclusion of the bottom rail/spline gives the bottom end of the substrate 20 some weight allowing the substrate 20 to hang vertically without rolling up at the bottom.

In addition, the string 500 can also be coupled to the frame using other techniques instead of passages through the slots 430. For example, the end caps can include hooks or other structures to which the string 500 can be attached for hanging the article.

Alternative Rail/Spline Construction

Figure 2:
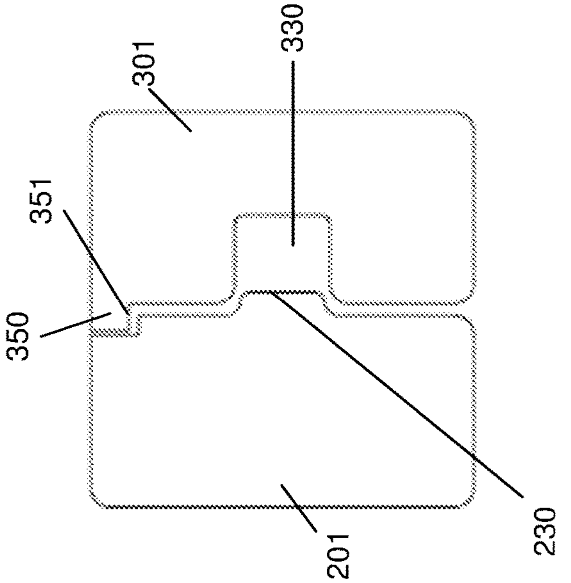
FIG. 2 is an end view of a spline and rail according to a different embodiment.

FIG. 2 is an end view of an alternative spline 201 and alternative rail 301. These parts are very similar to the spline 200 and rail 300 and therefore, like elements are numbered alike. For example, the spline 201 includes the raised ridge 230 and the rail 301 includes the channel 330.

At least one of the spline 201 and rail 301 includes a guide or locating feature for positioning the substrate 20. In the illustrated embodiment, the inner surface 310 of the rail 301 includes a protrusion (rib or bump, etc.) 350 that is formed at a location spaced from the channel 330. For example, the protrusion 350 is located at one edge of the rail 301. The protrusion 350 defines a shoulder 351 that acts as the substrate guide or stop to ensure proper justification of the substrate 20. For example, when positioning the substrate 20 over and against the rail 301, the one edge (e.g., top edge) of the substrate 20 is placed against the shoulder 351 before positioning the spline 201 against the rail 301. To accommodate this protrusion 350 (male feature), the spline 201 has a female feature such as a recessed portion (channel or recessed edge, etc.).

Alternative End Caps

Figure 3:
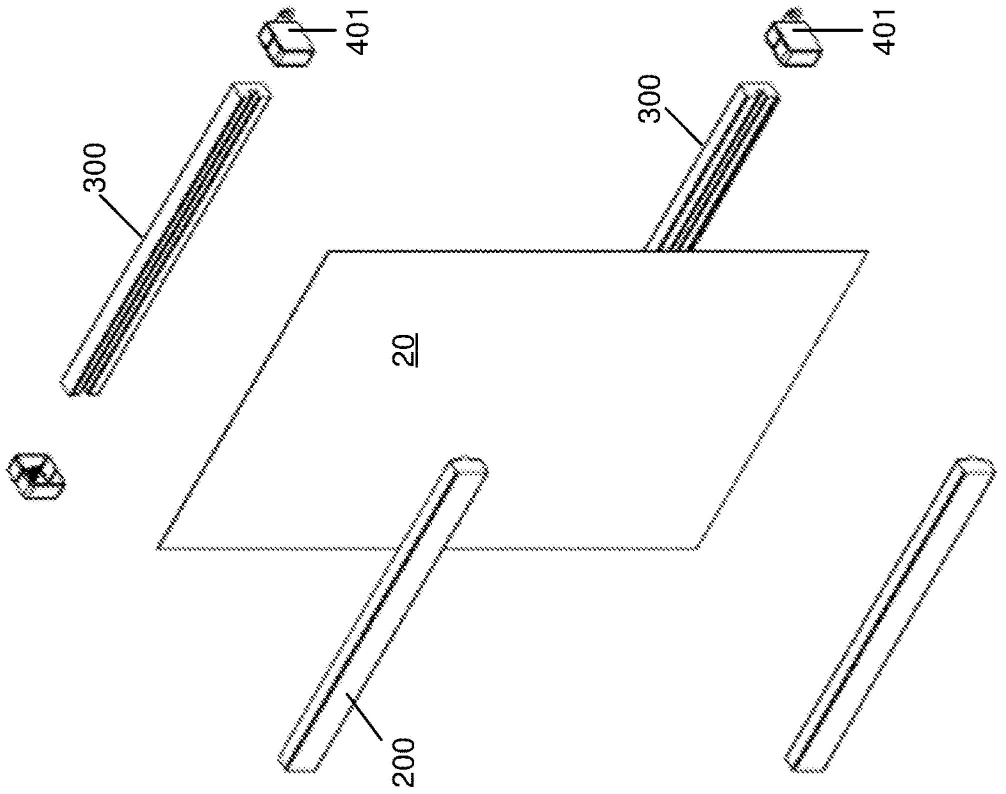
FIG. 3 is an exploded perspective view of a hanging frame assembly according to another embodiment.
Figure 4:
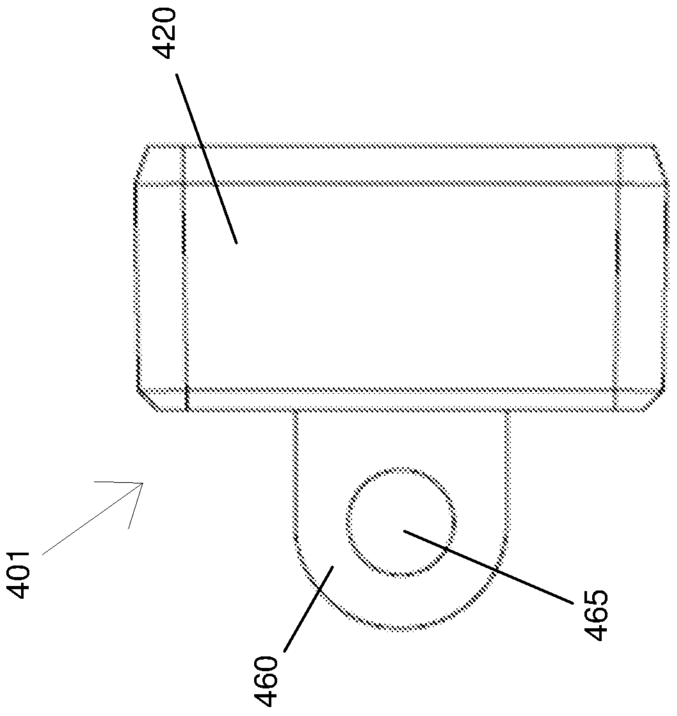
FIG. 4 is a side view of an end cap according to another embodiment.

FIGS. 3-5 illustrate an alternative end cap 401. The end cap 401 is similar to end cap 400 and therefore, like elements are numbered alike. The end cap 401 includes a mount feature that allows it to be mounted to the support surface, such as the wall. As best shown in FIG. 4, the mount feature can be in the form of a mounting tab 460 that protrudes outwardly from an outer surface of the end wall 410. The mounting tab 460 has a hole 465 for receiving a fastener, such as a screw, tack or nail for attaching the assembly to the support surface. In this way, both ends of the combined upper spline and rail are attached to the support surface by means of the mounting features of the end caps 401.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not precludes the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. An article for hanging on or being mounted to a support surface, the article comprising:

a substrate having a first end and a second end;

a first rail including a recessed channel that extends in a longitudinal direction;

a first spline including a raised ridge that extends in a longitudinal direction, the raised ridge being configured for at least partial insertion into the recessed channel; and a first pair of end caps, each end cap of the first pair of end caps having an end walls and side walls that define a hollow interior, wherein each end cap of the first pair of end caps further includes slots that are formed in two of the side walls that are opposite one another;

wherein each end cap of the first pair of end caps includes an off-centered protrusion formed along the end wall, the protrusion being received and frictionally held within one end of the channel that receives the substrate resulting in the substrate being pinched between the protrusion and the raised ridge;

wherein in an assembled state, the first rail and the first spline are disposed adjacent one another such that the raised ridge is at least partially inserted into the recessed channel and the substrate is captured between the rail and spline and the first pair of end caps are disposed over opposite ends of the first rail and the first spline to join and hold the first rail and the first spline against one another with the substrate captured therebetween.

2. The article of claim 1, wherein the substrate comprises a canvas.

3. The article of claim 2, wherein the canvas has a first end that is captured between the first spline and the first rail.

4. The article of claim 1, wherein the each of the first spline and the first rail formed of wood and the first pair of end caps is formed of plastic.

5. The article of claim 1, wherein the first rail includes a substrate guide for locating and placing the substrate along the first rail.

6. The article of claim 5, wherein the substrate guide comprises a rail protrusion along an inner surface of the first rail with a defined shoulder against which one edge of the substrate is placed.

7. The article of claim 6, wherein the first spline includes a recessed portion that receive the rail protrusion.

8. The article of claim 1, wherein each end cap includes a mounting tab for placement against a support surface.

9. The article of claim 8, wherein the mounting tab extends outwardly from an outer surface of the end wall and includes a hole for receiving a fastener.

10. The article of claim 1, wherein the substrate passes through the slots formed in the first pair of end caps.

* * * * *